US009253301B2

(12) United States Patent
Dhawan et al.

(10) Patent No.: US 9,253,301 B2
(45) Date of Patent: Feb. 2, 2016

(54) SYSTEM AND METHOD FOR ANNOUNCING AND ROUTING INCOMING TELEPHONE CALLS USING A DISTRIBUTED VOICE APPLICATION EXECUTION SYSTEM ARCHITECTURE

(75) Inventors: Vishal Dhawan, Centreville, VA (US); Timothy M. Price, Rockville, MD (US); Manoj Sindhwani, Oak Hill, VA (US)

(73) Assignee: XTONE NETWORKS, INC., Reston, VA (US)

( * ) Notice: Subject to any disclaimer, the term of this patent is extended or adjusted under 35 U.S.C. 154(b) by 263 days.

(21) Appl. No.: 12/717,839

(22) Filed: Mar. 4, 2010

(65) Prior Publication Data

US 2010/0158215 A1    Jun. 24, 2010

Related U.S. Application Data

(63) Continuation-in-part of application No. 11/514,116, filed on Sep. 1, 2006, now abandoned.

(60) Provisional application No. 61/157,287, filed on Mar. 4, 2009, provisional application No. 60/712,808, filed on Sep. 1, 2005.

(51) Int. Cl.
*H04M 1/253* (2006.01)
*H04M 1/247* (2006.01)
(Continued)

(52) U.S. Cl.
CPC ............ *H04M 1/2478* (2013.01); *H04M 1/578* (2013.01); *H04M 3/436* (2013.01); *H04M 1/006* (2013.01); *H04M 1/2535* (2013.01); *H04M 2250/74* (2013.01)

(58) Field of Classification Search
USPC ............. 379/201.01, 201.02, 201.03, 221.15, 379/93.02
See application file for complete search history.

(56) References Cited

U.S. PATENT DOCUMENTS 5,074,923 A    12/1991  Siemers et al.
5,323,444 A    6/1994   Ertz et al.
(Continued)

FOREIGN PATENT DOCUMENTS

WO    96/20448    7/1996

OTHER PUBLICATIONS

U.S. Appl. No. 12/717,893, filed Mar. 4, 2010.
(Continued)

*Primary Examiner* — Amal Zenati
(74) *Attorney, Agent, or Firm* — Nixon & Vanderhye P.C.

(57) ABSTRACT

A system and method for announcing and handling incoming telephone calls utilizes a distributed processing architecture. The distributed processing architecture makes use of local devices that can be located at various different locations where the user is often located. For instance, local devices could be at a user's home, a user's office and/or on a user's mobile device. The local devices are linked such than when there is an incoming telephone call directed to any one of multiple telephone numbers associated with the user, an announcement of the incoming call is provided at all of the user's locations. The user is also able to specify how the incoming call is to be handled on a call-by-call basis. The user may also be able to specify default call handling instructions so that an incoming telephone call directed to one of the user's telephone numbers is received by a device normally associated with a different one of the user's telephone numbers. The system allows the user to selectively forward incoming telephone calls to another specified number on a call-by-call basis.

16 Claims, 5 Drawing Sheets

(51) Int. Cl.
*H04M 1/57* (2006.01)
*H04M 3/436* (2006.01)
*H04M 1/00* (2006.01)

(56) References Cited

U.S. PATENT DOCUMENTS

| | | | |
|---|---|---|---|
| 6,334,103 | B1 | 12/2001 | Surace et al. |
| 6,408,272 | B1 | 6/2002 | White et al. |
| 6,636,831 | B1 | 10/2003 | Profit, Jr. et al. |
| 6,738,743 | B2 | 5/2004 | Sharma et al. |
| 6,757,781 | B2 | 6/2004 | Williams et al. |
| 6,829,334 | B1 | 12/2004 | Zirngibl et al. |
| 6,882,974 | B2 | 4/2005 | James et al. |
| 6,901,431 | B1 | 5/2005 | Dodrill et al. |
| 6,977,992 | B2 | 12/2005 | Zirngibl et al. |
| 6,988,070 | B2 | 1/2006 | Kawasaki et al. |
| 7,016,847 | B1 | 3/2006 | Tessel et al. |
| 7,020,609 | B2 | 3/2006 | Thrift et al. |
| 7,062,709 | B2 | 6/2006 | Cheung |
| 7,466,810 | B1 * | 12/2008 | Quon ............... H04M 3/42229 379/201.01 |
| 7,889,853 | B2 * | 2/2011 | Sutcliffe ................. 379/207.16 |
| 7,948,892 | B2 * | 5/2011 | Morinaga et al. ............ 370/235 |
| 8,064,588 | B2 * | 11/2011 | Brahm ............... H04M 3/4281 379/211.02 |
| 2002/0001370 | A1 | 1/2002 | Walker et al. |
| 2002/0059073 | A1 | 5/2002 | Zondervan et al. |
| 2002/0169604 | A1 | 11/2002 | Damiba et al. |
| 2002/0188451 | A1 | 12/2002 | Guerra et al. |
| 2003/0007609 | A1 | 1/2003 | Yuen et al. |
| 2003/0068999 | A1 | 4/2003 | Casali et al. |
| 2003/0144005 | A1 | 7/2003 | Videtich |
| 2003/0233238 | A1 | 12/2003 | Creamer et al. |
| 2004/0006471 | A1 | 1/2004 | Chiu |
| 2004/0010412 | A1 | 1/2004 | Chiu |
| 2004/0068364 | A1 | 4/2004 | Zhao et al. |
| 2004/0151285 | A1 | 8/2004 | Sychta |
| 2004/0163073 | A1 | 8/2004 | Krzyzanowski et al. |
| 2004/0230689 | A1 | 11/2004 | Loveland |
| 2005/0091057 | A1 | 4/2005 | Phillips et al. |
| 2005/0135338 | A1 | 6/2005 | Chiu et al. |
| 2005/0141679 | A1 | 6/2005 | Zirngibl et al. |
| 2005/0163136 | A1 | 7/2005 | Chiu et al. |
| 2005/0234720 | A1 | 10/2005 | Paillet et al. |
| 2005/0283367 | A1 | 12/2005 | Ativanichayaphong et al. |
| 2006/0047511 | A1 | 3/2006 | Hussain |
| 2006/0069701 | A1 | 3/2006 | O'Rourke, III |
| 2006/0122840 | A1 | 6/2006 | Anderson et al. |
| 2006/0293897 | A1 | 12/2006 | White et al. |
| 2007/0143113 | A1 | 6/2007 | Nanavati et al. |

OTHER PUBLICATIONS

U.S. Appl. No. 12/717,888, filed Mar. 4, 2010.
U.S. Appl. No. 12/717,875, filed Mar. 4, 2010.
U.S. Appl. No. 12/717,858, filed Mar. 4, 2010.
U.S. Appl. No. 12/717,854, filed Mar. 4, 2010.
U.S. Appl. No. 12/717,826, filed Mar. 4, 2010.
U.S. Appl. No. 12/717,897, filed Mar. 4, 2010.
U.S. Appl. No. 12/717,865, filed Mar. 4, 2010.
U.S. Appl. No. 12/717,881, filed Mar. 4, 2010.
U.S. Appl. No. 11/514,116, filed Sep. 1, 2006.
Office Action issued on Feb. 26, 2010 in U.S. Appl. No. 11/514,116.

* cited by examiner

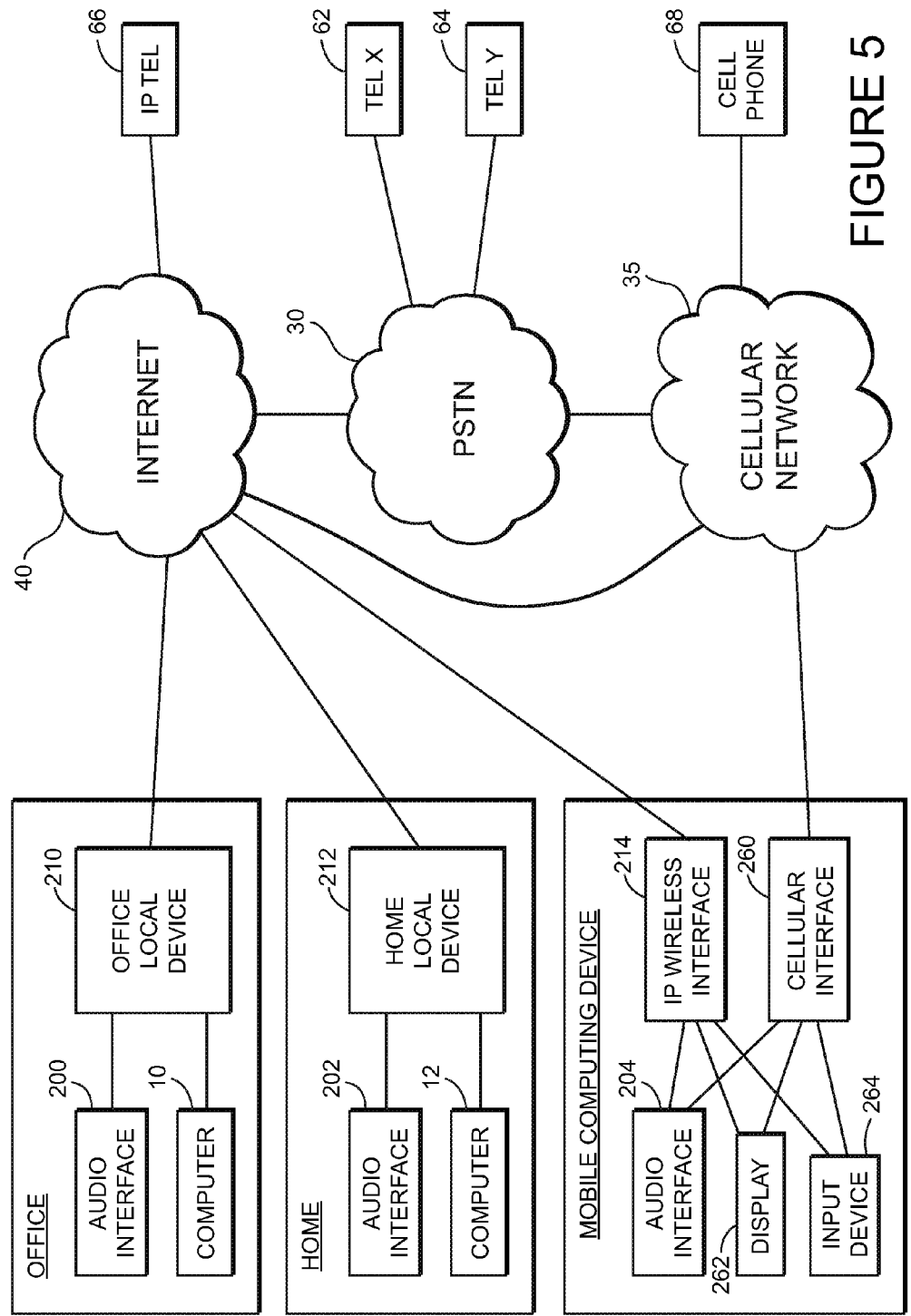

SYSTEM AND METHOD FOR ANNOUNCING AND ROUTING INCOMING TELEPHONE CALLS USING A DISTRIBUTED VOICE APPLICATION EXECUTION SYSTEM ARCHITECTURE

This application claims priority to the filing date of U.S. Provisional Application No. 61/157,287, which was filed on Mar. 4, 2009, the contents of which are hereby incorporated by reference. This application is also a continuation-in-part of U.S. application Ser. No. 11/514,116, which was filed on Sep. 1, 2006, now abandoned which itself claims priority to the filing date of U.S. Provisional Application No. 60/712,808, which was filed on Sep. 1, 2005, the contents of both of which are hereby incorporated by reference.

FIELD OF THE INVENTION

The invention relates to call handling capabilities. The invention also relates to novel systems and methods for announcing an incoming telephone call.

BACKGROUND OF THE INVENTION

Many individuals are now connected with three separate telephone numbers. Each person can have a home telephone number, an office telephone number and a cellular or mobile telephone number. As shown in FIG. 1, the person would have an office telephone 20 located at his office, a home telephone 22 located at his home, and a mobile or cellular telephone 24, each of which has a different telephone number. In the traditional arrangement, the home telephone 22 and office telephone 20 would be connected to the PSTN, while the cellular telephone would connect to the cellular telephone network 35, which is tied to the PSTN 30. As shown in FIG. 1, the person might also have an office computer 10 and a home computer 12 that are both connected to the Internet 40.

If a telephone call is made to a person's home number while the person is at work, or vice versa, it can result in a missed call. Also, some people will switch a cellular telephone off while at work or at home. If a call is placed to the person's cellular telephone number while it is off, or if the cellular telephone is simply not immediately adjacent the person, it can also result in a missed call.

Attempts have been made to address this problem. The most common way is through a call forwarding service. In a call forwarding arrangement, a person could use the telephone connected to a home telephone number, and input a series of key strokes to cause all future calls to the home telephone number to be re-directed to that person's office telephone number. Likewise, the person could do the same thing with their cellular telephone. As a result, all calls to any of the three telephone numbers would be sent to the person's office number. But call forwarding is not a complete solution, and it can cause its own problems.

Often a person will forget that a call forwarding instruction has been issued. When this occurs, the person may be unaware that all calls to the person's home and cellular telephone numbers are being directed to the person's office telephone number. When this occurs, once the person has left work for the day he will not receive any calls, regardless of where those calls are initially directed. Anyone trying to reach the person at any of the three numbers would be connected to the person's office telephone, which will not be answered. And it might be impossible to contact the person again until there he is once again back in the office.

In addition, it is usually necessary to use a telephone connected to a particular number to cause future calls to be directed to another number, or to cancel a call forwarding instruction. So, for instance, if a person has left home and has arrived at work in his office, it would be too late to instruct that all future calls to the person's home number be re-directed to the person's office number. Such an instruction could only be issued from the person's home telephone.

Moreover, call forwarding services are typically toll services that involve the payment of additional fees in addition to normal monthly fees, or normal per minute charges. Such call forwarding charges can become particularly expensive on cellular telephones.

There are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

BRIEF DESCRIPTION OF THE DRAWINGS

Embodiments of the invention will be described in detail with reference to the following drawings, in which like reference numerals refer to like elements, and wherein:

FIG. 5 is a diagram of another system embodying the invention.

DETAILED DESCRIPTION OF PREFERRED EMBODIMENTS

Figure 2:
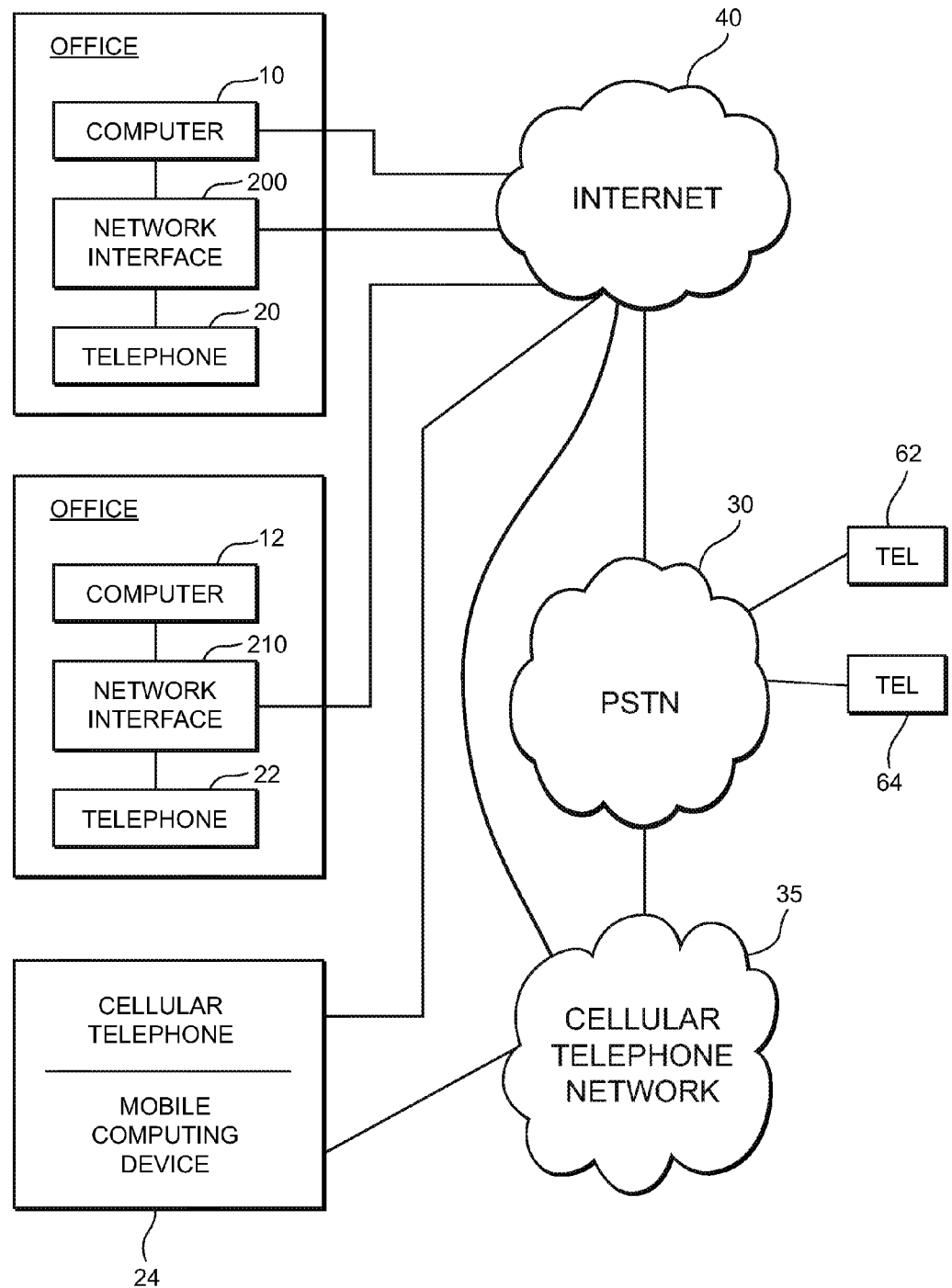
FIG. 2 is a diagram of elements of a system embodying the invention.

In recent years, the architecture model for computers and telephones has been slowly evolving towards the architecture illustrated in FIG. 2. In this architecture, the telephones 20, 22 are coupled to network interfaces 200, 210, which are themselves directly coupled to the Internet 40, or at least to a high speed digital data network. The computers 10, 12 may still be directly coupled to the Internet 40, or they may obtain access to the Internet through the network interface devices 200, 210. Of course, some telephones 62, 64 are still directly coupled to the PSTN 30.

In the new architecture illustrated in FIG. 2, the network interfaces 200, 210 would convert analog signals generated by traditional analog telephone devices into digital data streams, and these digital data streams would be communicated over the Internet. In implementing a telephone call between two telephones that are connected to the Internet via network interfaces devices, the entire path traveled between the network interface devices might consist of digital data traffic carried over the Internet, or through private digital data networks. Alternatively, a portion of the path between two network interface devices might traverse the PSTN in an analog fashion. Certainly, if a telephone call is made from the first telephone 20 to a telephone 62 that is coupled only to the PSTN, that call would necessarily travel through the PSTN 30.

In addition, cellular telephones have added more and more computing functionality, and are now more appropriately called mobile computing devices that incorporate a cellular telephone. Many of these mobile computing devices are capable of establishing an IP connection to a wireless router, to thereby access the Internet. As a result, such devices can complete a telephone call using either the cellular telephone network, or a wireless IP connection to the Internet.

The inventors have developed new systems and methods of delivering voice-based services to users which make use of some aspects of the basic architecture illustrated in FIG. 2. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 3, which depicts a high-level diagram of how a system embodying the invention would be organized.

Figure 3:
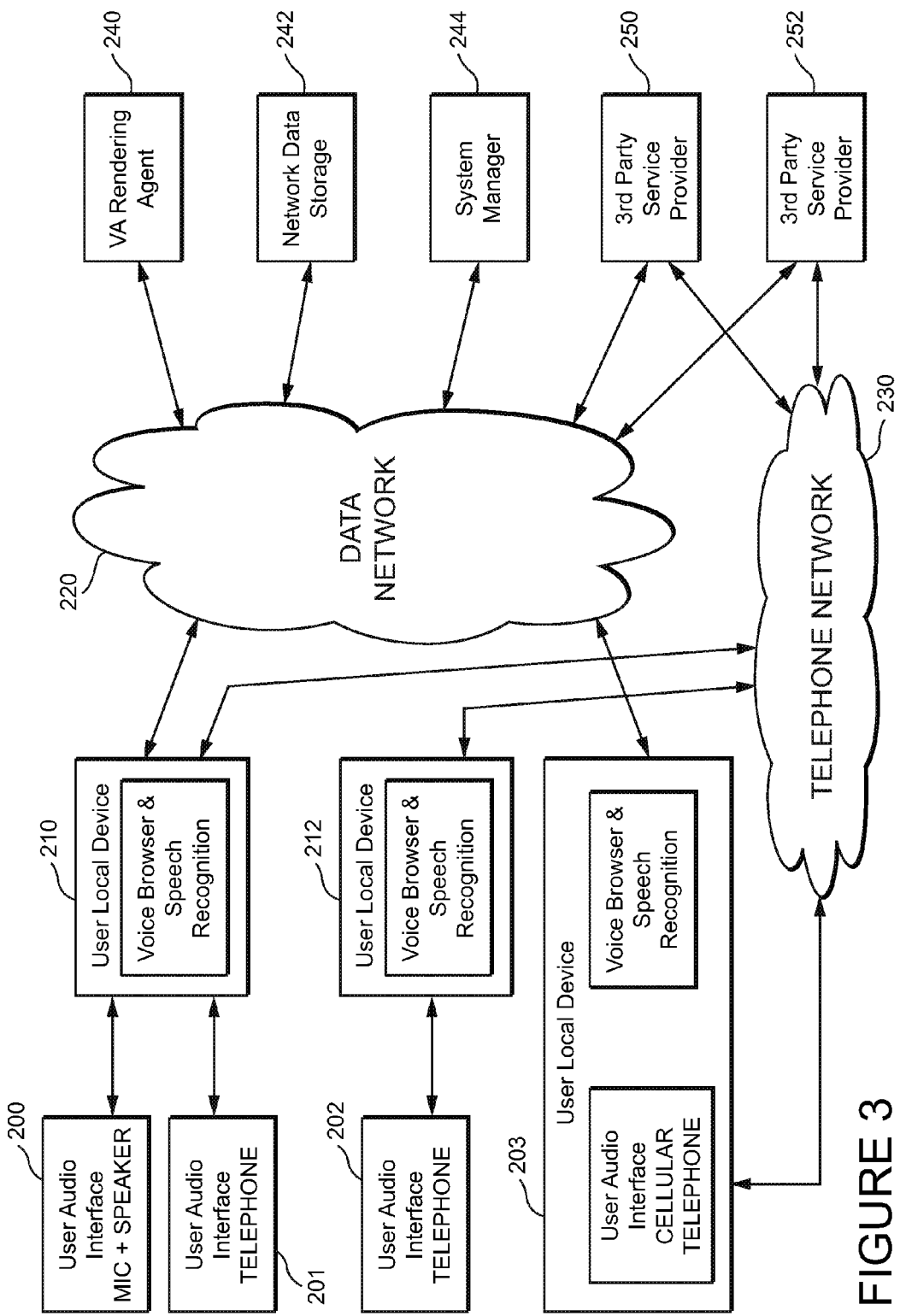
FIG. 3 is a diagram of an overall system architecture embodying the invention.

As shown in FIG. 3, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Systems embodying the invention, as shown in FIG. 3, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVEASA. In the embodiment shown in FIG. 3, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 3, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 3 is intended to illustrate this sort of an embodiment.

Also, in FIG. 3, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 3 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 3, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 3 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. The local device would interpret the user's spoken request, and then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to satisfy the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAESA can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Figure 4:
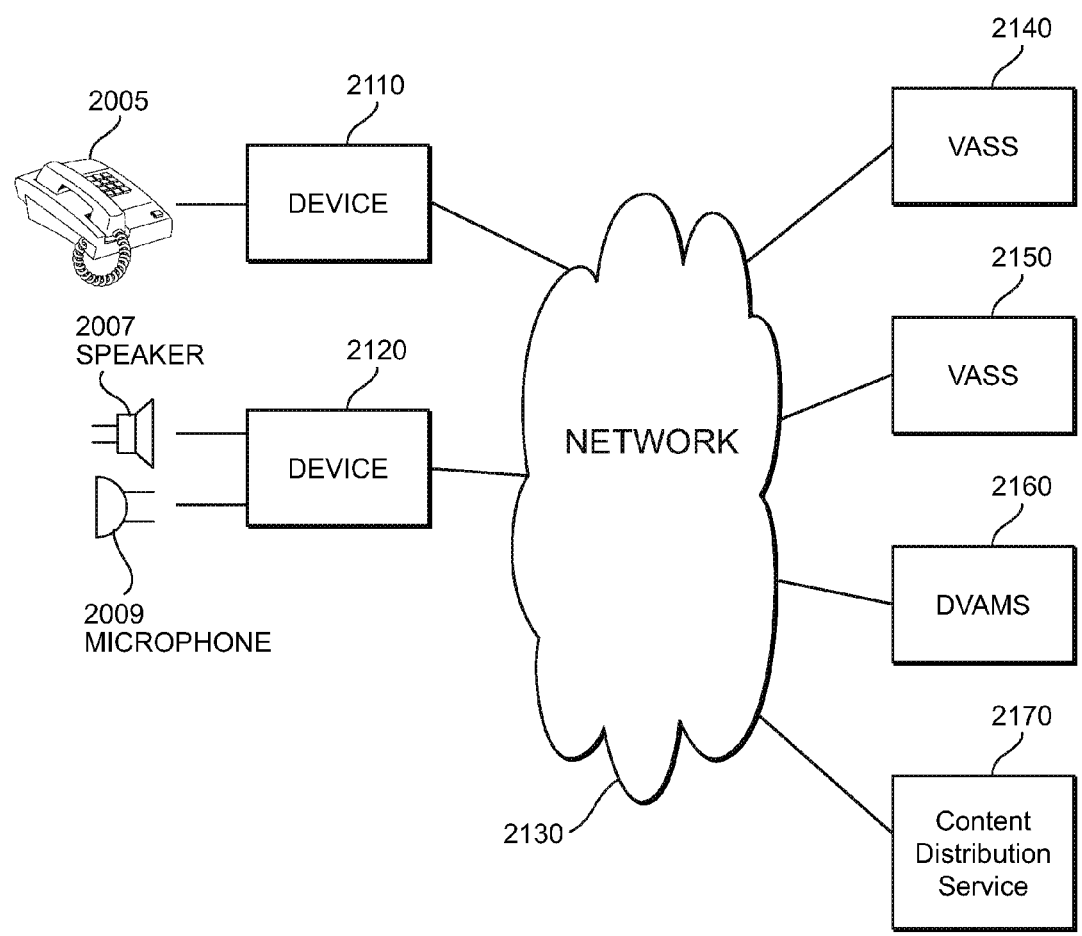
FIG. 4 is another diagram illustrating elements of a system embodying the invention.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 4. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 4 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

The devices 2110 and 2120 appearing in FIG. 4 would be the local embedded devices that are typically located at a user's home or office. As shown in FIG. 4, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 4, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 4 includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system.

Figure 1:
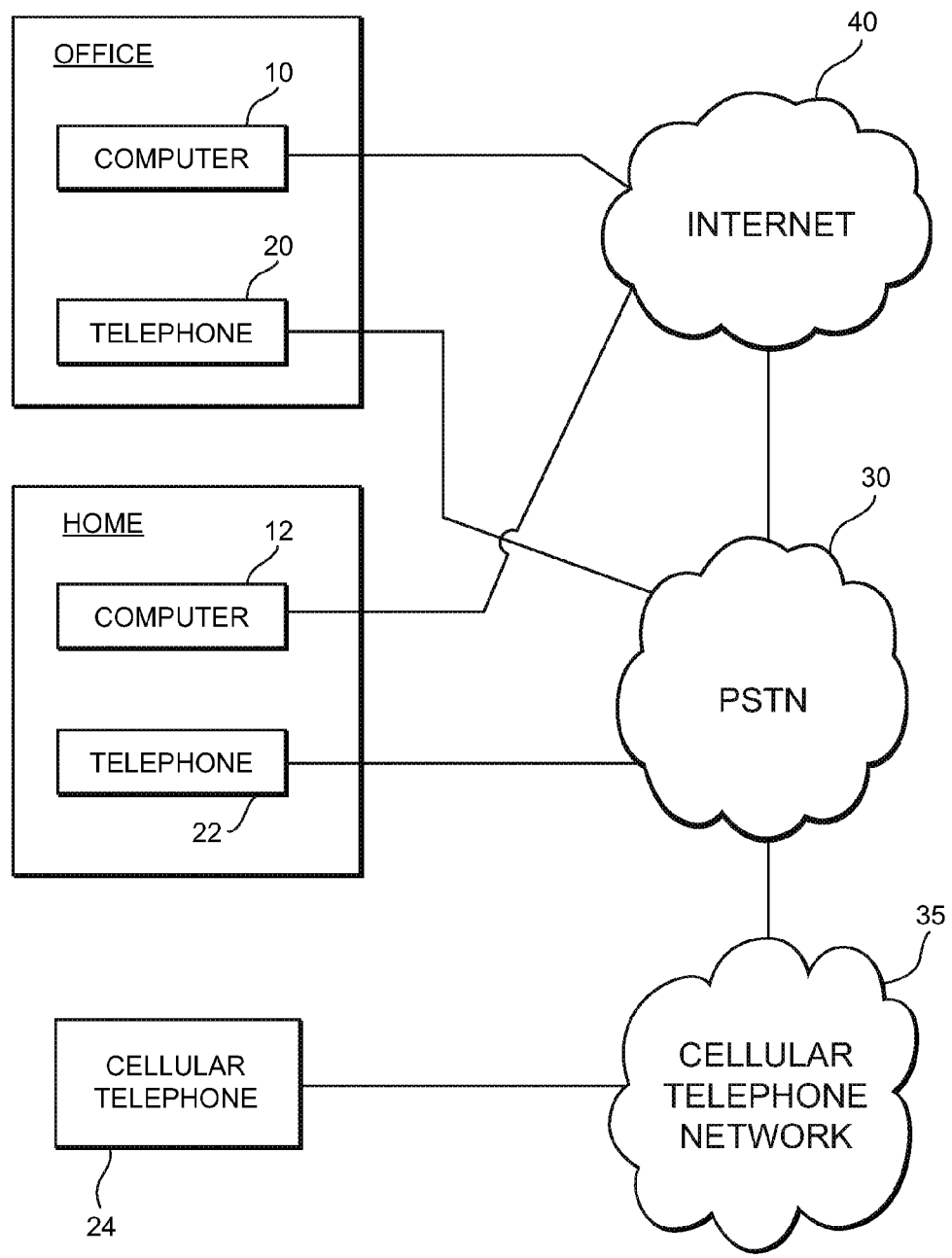
FIG. 1 is a diagram illustrating various elements that are used to connect telephone calls to user telephone devices.

An example of a system that includes features of the DVAES architecture described above, and aspects of a typical PSTN and cellular telephone network is illustrated in FIG. 5. This system will be used to explain the novel systems and methods for call announcing and call handling that have been developed by the inventors. Many of these functions would have been completely impossible in the prior art systems described above in connection with FIG. 1. And even where some functions would have been possible, the system illustrated in FIG. 5 makes it easier and less expensive to accomplish the functions.

As mentioned above, telephone service providers have provided users with call forwarding capabilities. However, the actions required to initiate and cancel call forwarding are somewhat burdensome. And because the carriers themselves provided the service, it was often necessary for a user to pay extra to utilize call forwarding. The DVAES architecture described above can provide the same basic call forwarding services as known systems in a less expensive fashion. In addition, the DVAES architecture makes it possible to provide various enhancements to the basic call forwarding functionality.

Assume that a person still has a home telephone number, an office telephone number, and a cellular telephone number. In the new architecture, as illustrated in FIG. 5, when a telephone call is placed to the person's home telephone number, the call is sent via the Internet to the person's home local device 212. The home local device would route the call to the person's home audio interface, which could be a typical analog telephone located in the person's home. As described above, in alternate embodiments the audio interface could take different forms. For instance, when a person's house is wired with speakers and microphones in multiple rooms, an incoming call could be routed to the speakers and microphones of all of the rooms simultaneously, or just to the room where the person is currently located.

When a telephone call is placed to the person's office telephone number, the call will be routed via the Internet to the person's office local device 210. The office local device would then send the call to the person's office audio interface 200. Here again, the office audio interface could simply be a telephone.

When a telephone call is placed to the person's mobile telephone number, the call would be routed to either the IP wireless interface 214 of the device, or the cellular interface 260 of the device. Which interface receives the call could depend on many factors. For instance, the device could be configured so that whenever it is within range of a wireless router, it will connect to the Internet and receive all calls via the IP wireless interface 214. When the device is not within range of a wireless router it could receive incoming calls via the cellular interface. These sorts of configuration details could be altered by the user as needed.

In a system as explained above, it would be possible to register all three telephone numbers with a single service used by the person. Then, when a call is placed to any one of the person's three numbers, in addition to connecting the call to the appropriate network interface device, an alert regarding the incoming call could be simultaneously sent to all of the display and/or audio devices connected with the person.

For instance, if a call is placed to the person's home telephone number, the system could route the call to the person's home local device 212, and the person's home audio interface 202 would provide an audible indication of the incoming call, probably by generating a ring tone. At the same time, the system might cause a ring or alert tone to be played on the person's office audio interface 200 and the person's mobile computing device audio interface 204. The alert tones played on the person's office audio interface 200 and mobile computing device audio interface 204 might be different from a normal incoming ring tone to indicate that although a call for the person is incoming, it is actually directed to a telephone number connected with a different location.

As an alternative to providing a ring tone, the voice applications being performed by each of the local devices might be configured to provide a spoken announcement of incoming calls. For instance, the user's home local device might play an audio recording that says "an incoming telephone call is being received." The recording that is played could be customizable in many different ways to conform to the user's desires.

If caller ID information for the call is available, the system could also identify the calling party. For instance, the system might provide a spoken announcement such as "a call is being received from John Doe." If no name is provided in the caller ID information, the system might perform a lookup procedure using the person's address book, and then identify the calling party. In still other instance, a voice application performed on the local device that receives the incoming telephone call could interact with the caller to determine the caller's identity. For instance, the voice application could answer the incoming telephone call and directly ask the caller to identify himself.

In a situation where a user has multiple audio interfaces located throughout his home, a voice application performed on the local device could be instructed to announce incoming calls on all audio interfaces, or just on selected ones. Regardless, if the user speaks a command to instruct the system to take a particular action, the system would then know the location of the user, and all future interaction with the user could occur through the audio interface at the user's present location.

As noted above, when a call is placed to the user's home telephone number, the system could provide an indication of the incoming call at the user's office and/or through the user's mobile telephone. If the announcement is a spoken one, the announcement could indicate that the telephone call was placed to the user's home telephone number. For instance, if a call is placed to the user's home telephone number, the user's home local device would announce the incoming call, but the user's office local device might also play an announcement such as "There is an incoming telephone call from John Doe that was placed to your home telephone number."

Likewise, the system could cause a text message to be displayed on one or more of the display devices that are used by the person. The text message could be provided in addition to a ring tone or a spoken announcement. Alternatively, the system could be instructed to provide only a text message in certain locations, or in certain instances. The text messages that are displayed to users could include various items of information about an incoming call. For instance, when a call is placed to the user's home telephone number, the system might cause a box of text to appear on the user's office computer and/or on the user's mobile device. The text could state "There is an incoming call from John Doe that was placed to your home telephone number."

The user would have great control over how telephone calls are announced. In some embodiments, the user could navigate to a web page to specify how calls are to be announced. This web page could allow the user to specify where alerts are to be provided, and what form they should take. Also, the web page might allow the user to specify a certain configuration for some hours of the day or days of the week, and an alternate configuration for other times of the day or hours of the week. And the user could re-configure the options at will.

Moreover, because a voice application on a local device in a system embodying the invention may be capable of interacting with the user by receiving and interpreting the user's spoken commands/input, the user might be able to change a call announcement option simply by speaking a command.

The foregoing description focused on announcing incoming calls. The following description will illustrate how a system embodying the invention can be used to provide a user with tremendous call handling flexibility.

As noted above, when a call is placed to one of the user's telephone numbers, an announcement of the incoming can be provided on some or all of the user's local devices. Thus, when the user is not at the location being called, the user is still made aware of the incoming call. The system can also be configured to redirect an incoming call to the user's present location. For instance, if the user is at his office, and a call is placed to the user's home telephone number, the user could instruct the system to re-direct the call to the user's office telephone.

A call could be re-routed from one location to another in multiple different ways. In some instances, a voice application performed on the local device which initially received the call could be able to signal to the telephone system that the call is to be re-directed to a different telephone number. In this instance, the telephone system itself would redirect the incoming call to the alternate telephone number.

In other instances, a voice application performed on the local device which initially received the telephone call may be capable of placing a new outbound telephone call to the user's alternate location where he wishes to receive the call. The voice application would then bridge the incoming call to the newly placed outgoing call. As a result, the call would ultimately be directed to the location where the user is currently located and where he wishes to receive the call.

Because the amount of time required to redirect a call is likely to be significant, it may be necessary for a voice application performed on the local device that initially receives the call to actually answer the call and basically place the call on hold until any desired call redirection can be accomplished. In this instance, the voice application might answer the incoming telephone call and play an audio message such as "please hold while your call is directed to the appropriate party." The call would then be put on hold and the system would wait to determine if the user wishes to receive the call at an alternate location.

In reality, the user could request multiple different actions be taken at this point in the process. The user could instruct that the incoming call be directed to a voicemail system. Alternatively, the user could request that the call be directed to an alternate location. In other instances, the user could decide to accept the call at the location where the incoming call was received. In still other instances, the user might decide to forward the call to a different party entirely. Still further, and as discussed in more detail below, the caller could request that a particular audio message be played to the caller and that the call then be terminated.

Once an incoming call has been answered by a voice application and put on hold, the system would then attempt to interact with the user to determine how the call is to be handled. As noted above, the announcement of an incoming call could be displayed as text on one or more display screens visible to a user at various locations. Alternatively, or in addition, an audio announcement could be played over one or more of the user's audio interfaces located at various different locations.

For instance, if the call was originally placed to the user's home telephone number, and the user is presently located at his office, an audio announcement of the incoming call could be played to the user over the user's office audio interface. And the audio announcement could state "There is an incoming telephone call from John Doe that was placed to your home telephone number. Would you like to receive the call here?"

The user could provide instructions about how to handle the call in multiple different ways. Instructions about how to handle the call could be provided through the user's office computer, which is connected to the user's office local device. Or the instructions about how to handle the call could be provided by speaking commands that are received and interpreted by a voice application performed on the user's office local device. As noted above, the interpretation of spoken commands could be performed entirely by a voice application on the local device, or the interpretation could be done in whole or in part using remote speech recognition resources that are available to the voice application through the data network 40.

As noted above, it was possible to redirect telephone calls in prior systems by setting up a call forwarding instruction. In the context of this example, it would be possible to instruct an existing system to redirect all calls placed to a user's home telephone number to the user's office telephone number. However, the prior systems would then forward all calls to the user's office telephone number until the call forwarding instruction was canceled.

In contrast, with a system as described above, a user can determine how to handle calls on a call-by-call basis. And incoming calls can be handled in different ways from one call to the next. A first call could be re-directed to an alternate telephone number. The next call could be sent to voice mail. The call after that could be accepted. And the decision about how to handle each call can be made from any location where the user happens to be present when the call arrives. Thus, the user is provided with complete control over how all calls are handled.

The decision about how to handle an incoming call could depend on the identity of the calling party. Thus, the ability to provide the user with information about the identity of the calling party could be important. The system could be instructed to provide all caller ID information in any incoming call announcements. And as noted above, the system might also utilize the user's address book to link a name to the telephone number from which incoming calls have been placed. The system might also be able to access and consult third party telephone directories to determine the identity of a calling party. For instance, the system could consult a third party reverse telephone number directory to match the identity of a calling party to the telephone number from which the call was placed. If the called ID information does not include a name, the system might at least be able to determine the state and local area where the call originated based on the number of the calling party. Thus, the system might at least be able to announce the location from which the call originated. And, as explained above, a voice application could actually answer the call and ask the caller to identify himself before announcing the incoming call the user.

When an incoming call is received, the user could instruct the system to connect the call to the audio device at the user's current location. Alternatively, the user might instruct the system to not answer the call at all, or to direct the call to either a business or a personal voice mail system. In those instances where the incoming call is being directed to a voice mail system, the user might be able to listen to the message left by the caller, regardless of his location. Further, the system could have default actions which are to be followed in the event that the user does not provide any call handling instructions. And the default instructions might vary depending on the time of day or the day of the week.

In still other instances, the user might be able to instruct the system to forward an incoming telephone call to another party. For instance, if a call is placed to the user's home telephone number, and the user receives a call announcement such as "There is an incoming call from John Doe. Would you like to answer the call?" The user could respond by saying "Forward the call to Jane Smith." The system could conduct a lookup of Jane Smith's telephone number utilizing the user's address book, or any third party address service and the system could then forward the incoming call on to that number. As noted above, in some instances, the forwarding of a call could be accomplished by having a voice application performed on the local device instruct the telephone system to re-direct the call to an alternate location. In other instances, the voice application performed on the local device that initially receives a call might need to place a new outgoing call to the number to which the call is being forwarded, and the voice application would then bridge the incoming call and the newly placed outgoing call.

In situations where the user decides to forward the call to another party, the system might initially answer the call and place the call on hold. Once the user decides to forward the call to another party, a voice application performed on the local device might play the calling party an announcement to inform him that the call is being redirected. For instance, the voice application might play the caller a message such as "Your call is being re-directed to Jane Smith." The system would then connect the caller to Jane Smith's telephone number.

In addition to directing an incoming call to a voice mail system or to a third party, the user might be able to instruct the system to play the calling party any one of multiple pre-recorded audio messages. And the command to play such a recording could be issued by the user through his mobile computing device or from his office, even though the call is directed to the user's home telephone number.

If the user does not wish to specify incoming call handing procedures on a call-by-call basis, the user could also issue standing call handling instructions. For instance, the user could issue specific call forwarding instructions at any time, from any of the different input devices. For instance, the user could issue call forwarding instructions from his office which would cause the system to re-direct all calls directed to his home telephone number to his office telephone number. Likewise, a call forwarding instruction to forward calls directed to the user's home number to the user's office number could be canceled from the user's office local device, or even from the user's mobile computing device. There would be no need to issue call forwarding instructions for a particular telephone number from a device that is physically connected to that telephone line, as is the case with prior systems.

Moreover, call handling instructions could be based on the identity of the calling party. For instance, a user might issue instructions that will cause any calls from Jane Smith that are directed to the user's home or mobile numbers to be forward to the user's office number during business hours. But all other calls placed to the user's home telephone number are to be sent to the user's home voicemail. Various other call handling instructions could also be issued based on the identity of the calling parties.

Call handling instructions could also be specified by the user at any time using a computer that is connected to the system. For instance, the person could navigate to a web page that presents the user with configuration options for handling calls directed to each of the telephone numbers associated with the person. And the call handling instructions could be time-of-day dependent, and/or day-of-the-week dependent. These configurable options could also allow the person to specify how incoming call announcements are to be played or displayed on various computers or display screens, what information is to be provided, and whether, where and how audio alerts are to be given. For instance, a person could specify that incoming telephone calls to the user's home number should cause an alert to be displayed/played on the person's office computer, but that calls to the person's office should not cause an alert to be played on the user's home computer.

As noted above, the system could be directed to play a message to a calling party. This could occur because the user instructs the system to play a particular message to a particular calling party after the call has already been received. In other instances, the user might instruct the system to play a particular message to a particular calling party anytime that the calling party tries to reach the user. In this instance, a voice application on the local device that receives the call would determine the identity of the calling party using any of the methods described above. And then based on the identity of the calling party, the system would know to play a particular message to the calling party. Different messages could be established for different calling parties.

This sort of a standing instruction could also be used to deal with calls from telemarketers. For instance, whenever a call is received at a local device, a voice application on the local device determine the identity of the calling party, or at least the telephone number of the calling party, and the voice application could consult a central listing of telemarketers to determine if the caller is a telemarketer. The central listing could be maintained by the system, or it could be a third party listing that is maintained by another party, and which is reachable via the data network. Anytime that the voice application determines that the calling party is a telemarketer, or some other undesirable party, the voice application could answer the call and play a message to the calling party indicating that the user is refusing to receive the call, and that the calling party should not make any further attempts to call again. Here again, different messages could be played to different calling parties, depending on the situation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of handling an incoming telephony communication sent by a calling party, comprising:
   receiving an incoming telephony communication at a mobile telephony device which has at least some components of a voice applications agent loaded thereon;
   causing a voice application to run, wherein the voice applications agent causes the voice application to run in response to receipt of the incoming telephony communication, and wherein at least some components of the voice application are loaded on the mobile telephony device; and
   handling the incoming telephony communication, wherein the voice application performs the handling step, and where the handling step comprises:
   playing a message to the calling party; and
   instructing a telephony service to cause the incoming telephone communication to be forwarded to a forwarding telephone number.

2. The method of claim 1, wherein the incoming telephony communication is an incoming telephone call.

3. The method of claim 2, wherein handling the incoming telephony communication comprises the voice application obtaining information about an identity of the calling party.

4. The method of claim 3, wherein handling the incoming telephony communication further includes the voice application causing the mobile telephony device to play an announcement of the telephone call to the called party, the announcement including information about the identity of the calling party.

5. The method of claim 3, wherein obtaining information about the identity of the calling party comprises the voice application:
   playing an audio message to the calling party that asks for the identity of the calling party; and
   receiving a spoken response provided by the calling party.

6. The method of claim 5, wherein handling the incoming telephony communication further comprises the voice application interpreting the received spoken response.

7. The method of claim 3, wherein the message played to the calling party is based on information about the identity of the calling party.

8. A method of handling an incoming telephony communication sent by a calling party, comprising:
   receiving an incoming telephony communication at a mobile telephony device which has at least some components of a voice applications agent loaded thereon;
   causing a voice application to run, wherein the voice applications agent causes the voice application to run in response to receipt of the incoming telephony communication, and wherein at least some components of the voice application are loaded on the mobile telephony device; and
   handling the incoming telephony communication, wherein the voice application performs the handling step, and wherein handling the incoming telephony communication comprises the voice application:
   playing an audio message to the calling party that asks the calling party to identify a purpose of the call;
   receiving a spoken response provided by the calling party; and
   causing the mobile telephony device to play a message to the called party which provides information about the call that was obtained during the receiving step.

9. The method of claim 8, wherein handling the incoming telephony communication further comprises the voice application interpreting the received spoken response, and wherein the causing step comprises causing the mobile telephony device to play a message to the called party which provides information obtained during the interpreting step.

10. The method of claim 1, wherein the mobile telephony device is associated with a first user, and wherein handling the incoming telephony communication includes the voice application causing an alert regarding the incoming telephone communication to be given at a local device other than the mobile telephony device, the local device also being associated with the first user.

11. The method of claim 10, wherein handling the incoming telephony communication further comprises the voice application:
   receiving a message from the local device asking that the incoming telephony communication be re-directed to the local device; and
   instructing a telephony service to cause the incoming telephone communication to be forwarded to a forwarding telephone number comprises instructing a telephony service to cause the incoming telephony communication to be redirected to the local device.

12. A method of handling an incoming telephony communication sent by a calling party, comprising:
   receiving an incoming telephony communication at a mobile telephony device which has at least some components of a voice applications agent loaded thereon;
   causing a voice application to run, wherein the voice applications agent causes the voice application to run in response to receipt of the incoming telephony communication, and wherein at least some components of the voice application are loaded on the mobile telephony device; and
   handling the incoming telephony communication, wherein the voice application performs the handling step, and wherein handling the incoming telephony communication comprises the voice application:
   causing the mobile telephony device to play an announcement regarding the incoming telephony communication to a user of the first local device;
   receiving spoken input from the user of the mobile telephony device; and
   handling the incoming telephony communication based on the received spoken input.

13. The method of claim 12, wherein handling the incoming telephony communication further comprises the voice application interpreting the received spoken input from the user, and wherein handling the incoming telephony communication based on the received spoken input comprises handling the incoming telephony communication based on the interpretation of the received spoken input.

14. The method of claim 13, wherein the voice application employs speech recognition assets of a remote device which is accessible via a data network to perform the interpreting step.

15. A non-transitory computer readable medium having instructions stored thereon, which when executed by one or more processors of a mobile telephony device and/or one or more processors of at least one computer server in communication with the mobile telephony device, cause the mobile telephony device and/or the at least one computer server to perform a method of handling an incoming telephony communication sent by a calling party, the method comprising:
   receiving an incoming telephony communication at a mobile telephony device which has at least some components of a voice applications agent loaded thereon;
   causing a voice application to run, wherein the voice applications agent causes the voice application to run in response to receipt of the incoming telephony communication, and wherein at least some components of the voice application are loaded on the mobile telephony device; and
   handling the incoming telephony communication, wherein the voice application performs the handling step, and where the handling step comprises:
   playing a message to the calling party; and
   instructing a telephony service to cause the incoming telephone communication to be forwarded to a forwarding telephone number.

16. The non-transitory computer readable medium of claim 15, wherein the incoming telephony communication is an incoming telephone call.

* * * * *